Patented July 30, 1929.

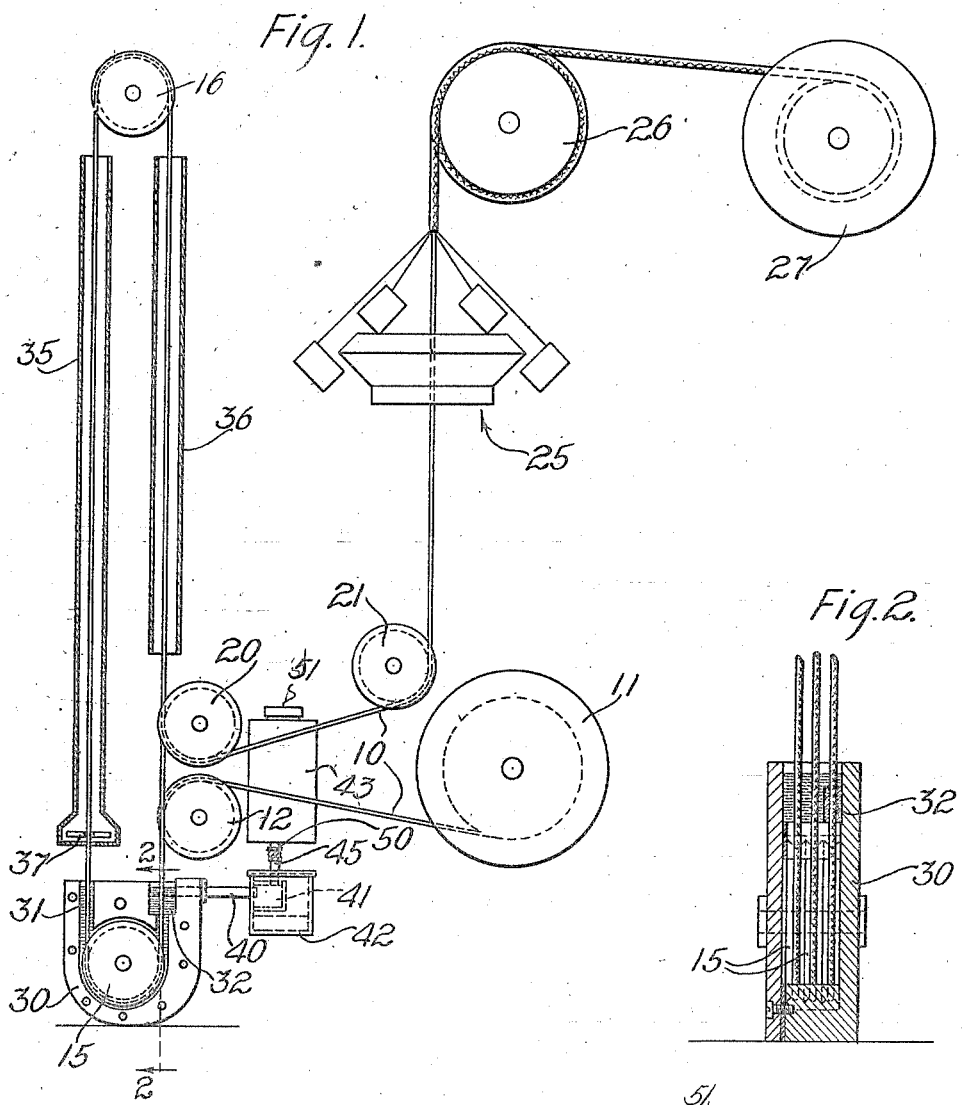
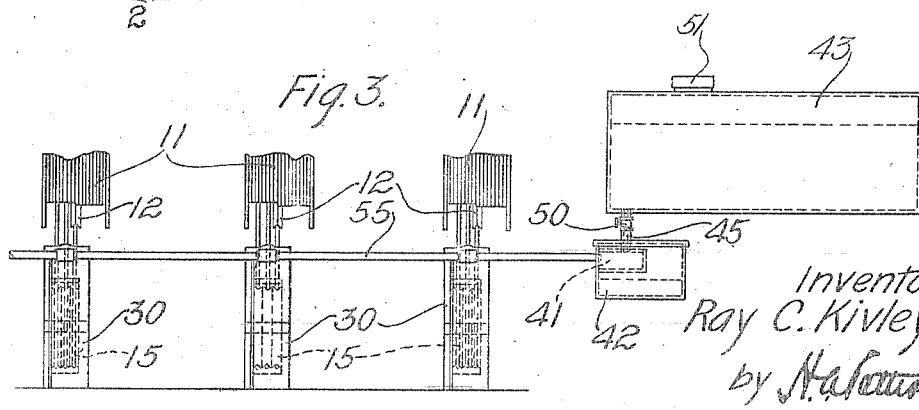

1,722,379

UNITED STATES PATENT OFFICE.

RAY CHARLES KIVLEY, OF OAK PARK, ILLINOIS, ASSIGNOR TO WESTERN ELECTRIC COMPANY, INCORPORATED, OF NEW YORK, N. Y., A CORPORATION OF NEW YORK.

APPARATUS FOR COATING STRAND MATERIAL.

Application filed December 12, 1925. Serial No. 75,017.

This invention relates to apparatus for coating strand material, and more particularly to apparatus for applying a flame-proofing coating to electrical conductors.

In producing electrical conductors of the character disclosed in copending application, Serial No. 721,370, filed June 20, 1924, by Henrik Boving, a coating of sodium silicate is applied over a rubber insulation to exclude oxygen from the rubber and thus reduce the likelihood of the rubber burning. The sodium silicate is applied to the wire in the form of a water solution thereof, and subsequently subjected to heat to volatilize the water and leave a continuous coating of flexible sodium silicate. However, in performing these operations with apparatus which has been used heretofore for this purpose it has been necessary to exercise extreme care to insure satisfactory and uniform results because the character of the coating varies greatly with slight changes in concentration of the solution, and exposure of the solution to the air will very quickly produce a change in the composition due to the evaporation of water. This evaporation, besides increasing the concentration of the solution, also causes a scum to form on top of the sodium silicate, and this scum adheres to the wire to form lumps which may clog guide pulleys and other portions of the apparatus and which might produce an inferior product. There may also be some difficulty in obtaining an adherence of the sodium silicate to the rubber insulation of the wire, because many rubber compounds used for insulating purposes contain some paraffin which may in some instances prevent the sodium silicate solution, having the surface tension characteristics of water, from adhering evenly to the surface thereof.

The object of the present invention is to provide apparatus for expeditiously applying a uniform coating of a liquid material to a strand.

In one embodiment of the invention the strand to be subjected to a solution of sodium silicate passes over sheaves located in a receptacle which contains only a sufficient amount of sodium silicate to completely immerse the sheaves, resulting in the application of a coating on the strand, and which is so designed that only a very small area of the sodium silicate is exposed to the air, thereby reducing to a minimum the evaporation of the water contained in the solution. In order to facilitate the application of the sodium silicate a sponge rubber wiper is positioned in the receptacle below the level of the solution contained therein to mechanically assist in the adhesion of the liquid to the strand. After the application of the coating of sodium silicate the strand is passed through a heated tube serving to effectively dry the sodium silicate coating. The level of the sodium silicate in the receptacle is maintained constant by the use of an automatic feeding arrangement which responds, when the level of the solution contained in the receptacle falls below a certain point, to supply an additional amount of solution to bring the level of the solution to a predetermined point.

The invention will be more fully understood from the following detailed description taken with the accompanying drawings, in which Fig. 1 is a schematic elevational view, partially in section, of an apparatus embodying the main features of the invention showing the manner in which the coating apparatus is utilized to apply a coating to a strand before the introduction of the strand into a braiding machine for applying a braided covering thereon;

Fig. 2 is an enlarged fragmentary vertical sectional view taken on the line 2—2 of Fig. 1 looking in the direction of the arrows, and Fig. 3 is a fragmentary front elevation showing the manner in which a single reservoir is utilized to supply coating solution to a number of machines.

Referring now to the drawings in which like numerals are employed to designate similar members throughout the several views, a strand 10 which may be an electrical conductor covered with rubber insulation and which is to be coated with a liquid material such as sodium silicate to render the insulation less inflammable is drawn from a source of supply 11, over a guide pulley 12, a plurality of sets of sheaves 15, 15 and 16, 16, respectively, guide pulleys 20 and 21, through a braiding machine of any suitable and ordinary type designated generally by the numeral 25 by a capstan 26, whence the coated and braid covered strand is taken up on a suitable take-up spool 27. The sheaves 15, 15, made preferably of hard rubber, are mounted in a chamber 30 which is supplied with a solution of sodium silicate indicated by the numeral 31, the chamber being so designed that a comparatively small area of surface of the sodium silicate is exposed to the air. A sponge rubber wiper 32 is provided to promote the adhesion of the sodium silicate solution to the strand on the first pass of the strand through the chamber 30 by mechanically bringing the sodium silicate into intimate contact with the strand. Intermediate the sheaves 15, 15 and 16, 16 are a pair of tubes 35 an 36, the former, containing a heating element 37, being for the purpose of drying the strand, and the tube 36 being simply a tube to prevent injury to the coating on the strand 10.

The chamber 30 is supplied with sodium silicate through a pipe 40 which is connected with a vessel 41 positioned in a receptacle 42 (Fig. 3), which vessel 41 is adapted to be supplied with a sodium silicate solution from an air tight reservoir 43. A fountain feed is supplied from the reservoir 43 into the vessel 41 by a short pipe 45 projecting downwardly into the vessel 41 in such a manner that the sodium silicate solution will be discharged therethrough as long as the lower orifice of the pipe 45 is exposed, but when such orifice is sealed by the liquid in the vessel 41 further flow thereof is prevented. This results in having a uniform level of the sodium silicate solution in the vessel 41 and since a direct connection is afforded between the vessel 41 and the chamber 30 a uniform level is maintained in the chamber 30 as well. The receptacle 42 is partially filled with water and covered so that a humid atmosphere is maintained therein, thus effectually preventing evaporation of water from the sodium silicate solution contained in the vessel 41. A cut-off valve 50 is inserted in the pipe 45 and a filler cap 51 is provided on the reservoir 43. This permits the filling of the reservoir 43 while the machine is in operation, the valve 50 being closed and the filler cap 51 removed to permit filling of the reservoir. This prevents flow of the sodium silicate solution through the pipe 45 which would take place if air were admitted into the reservoir through the filling opening provided. When a new charge of sodium silicate is placed in the reservoir it is entirely filled so that substantially no air remains therein. The time required to refill the reservoir is short enough so that the level of the sodium silicate solution in the chamber 30 is not appreciably lowered.

Fig. 3 shows an arrangement in which the reservoir 43 is common to a plurality of coating machines. In this figure a line pipe 55 is connected with the vessel 41 in the receptacle 42, and extends along in front of the several coating machines and a short pipe (not shown) is utilized at each machine position to connect the line pipe 55 with the chamber 30 individual to each machine.

What is claimed is:

1. In an apparatus for applying a liquid material to a strand, a chamber for containing the liquid material, said chamber having a small opening to present a restricted area of the liquid material to the air, a passageway for supplying the liquid material to the chamber, a second chamber communicating with the passageway, a reservoir for the liquid material having a pipe extending into the second chamber for controlling the flow thereof into the second chamber, means for maintaining a humid atmosphere above the second chamber, means for advancing the strand through the opening in the first mentioned chamber to coat it with the liquid material, and means for drying the resulting coating on the strand.

2. In an apparatus for applying sodium silicate to a strand, a chamber for containing a solution of sodium silicate, said chamber designed to restrict the area of the solution exposed to the air, a passageway for supplying the solution to the chamber, a second chamber communicating with the passageway, means for maintaining a humid atmosphere above the second chamber, a reservoir for the sodium silicate having a pipe extending into the second chamber for controlling the flow of sodium silicate into the second chamber, means for advancing the strand through the chamber to coat the strand with the solution, and means for drying the resulting coating on the strand.

3. In an apparatus for applying sodium silicate to an insulated conductor, a chamber for containing a solution of sodium silicate, said chamber designed to restrict the area of the solution exposed to the air, a passageway for supplying the solution to the chamber, a second chamber communicating with the passageway, a reservoir for the sodium silicate solution having a pipe extending into the second chamber for controlling the flow of the sodium silicate solution into the second chamber, a plurality of sheaves in the chamber, a plurality of oppositely disposed sheaves, means for advancing the conductor over the sheaves to coat it with the solution, means positioned in the chamber for promoting the adhesion of said coating to the conductor, and means for drying the coating to leave a solid coating of sodium silicate on the conductor.

4. In an apparatus for applying a liquid material to a strand, a chamber for containing the liquid material, means for advancing the strand through the chamber to apply a coating thereto, means for supplying liquid material to the chamber, and means for maintaining a humid atmosphere in the presence of liquid material in the supplying means.

5. In an apparatus for applying a liquid simultaneously to a plurality of strands, a chamber for each strand containing the liquid material, a common reservoir, means for automatically controlling the flow of the liquid material from the reservoir to the chambers, means for maintaining a humid atmosphere above the controlling means, means for advancing the strands through the chambers a plurality of times to coat the strand with the solution, and means for drying the resulting coating on the strand.

6. In an apparatus for applying a liquid material to a strand, a chamber for containing the liquid material, means for automatically controlling the amount of the liquid material in the chamber, means for advancing the strand through the chamber to apply a coating thereto, and stationary resilient means submerged in the liquid material completely surrounding and engaging the strand for promoting the adhesion of the liquid material thereto.

In witness whereof I hereunto subscribe my name this 25th day of November, A. D. 1925.

RAY CHARLES KIVLEY.